(12) United States Patent
Ramprashad et al.

(10) Patent No.: US 8,339,948 B2
(45) Date of Patent: Dec. 25, 2012

(54) METHOD FOR IMPROVING CAPACITY IN MULTI-HOP WIRELESS MESH NETWORKS

(75) Inventors: Sean A. Ramprashad, Los Altos, CA (US); Christine Pepin, Mountain View, CA (US); Ulas C. Kozat, Mountain View, CA (US)

(73) Assignee: NTT DoCoMo, Inc., Tokyo (JP)

( * ) Notice: Subject to any disclaimer, the term of this patent is extended or adjusted under 35 U.S.C. 154(b) by 1003 days.

(21) Appl. No.: 11/531,384

(22) Filed: Sep. 13, 2006

(65) Prior Publication Data
US 2007/0091805 A1 Apr. 26, 2007

Related U.S. Application Data

(60) Provisional application No. 60/717,903, filed on Sep. 16, 2005.

(51) Int. Cl.
*H04J 3/14* (2006.01)
(52) U.S. Cl. ............ 370/230.1; 370/230; 370/232; 370/235; 370/236; 370/469; 370/329; 455/450; 455/509
(58) Field of Classification Search .......... 370/338, 370/230.1, 235, 230, 232, 236, 329, 469; 455/1–3.06, 450, 459
See application file for complete search history.

(56) References Cited

U.S. PATENT DOCUMENTS

| | | |
|---|---|---|
| 6,507,566 B1 | 1/2003 | Noda et al. |
| 7,068,600 B2 * | 6/2006 | Cain .............................. 370/230.1 |
| 2003/0185169 A1 * | 10/2003 | Higgins ........................... 370/329 |
| 2004/0100903 A1 * | 5/2004 | Han et al. ......................... 370/230 |
| 2004/0105412 A1 * | 6/2004 | He et al. ........................... 370/338 |
| 2005/0259619 A1 * | 11/2005 | Boettle et al. .................. 370/331 |
| 2005/0271006 A1 * | 12/2005 | Chari et al. ..................... 370/329 |

FOREIGN PATENT DOCUMENTS

| | | |
|---|---|---|
| JP | 2004-180192 | 6/2004 |
| JP | 2004-187297 | 7/2004 |
| JP | 2004-523939 | 8/2004 |
| JP | 2004-248263 | 9/2004 |
| JP | 2005-524336 | 8/2005 |
| JP | 2007-502584 | 2/2007 |
| JP | 2007-510365 | 4/2007 |

(Continued)

OTHER PUBLICATIONS

Thompson, Bruce; Koren, Tmima; Wing, Dan, "Tunneling Multiplexed Compressed RTP ("TCRTP")" Internet Engineering Task Force, Cisco Systems, Sep. 2004, pp. 1-21.

(Continued)

*Primary Examiner* — Patrick Edouard
*Assistant Examiner* — Shantell L Heiber
(74) *Attorney, Agent, or Firm* — Haynes and Boone, LLP

(57) ABSTRACT

Wireless access efficiency is improved in a multi-hop, multiple-flow network by optimizing multi-flows over the entire network using joint routing and traffic-shaping techniques at intermediate hops. Even though the joint routing and traffic-shaping techniques may adversely affect flows at some hops, when considered over multiple hops (for a given flow) and over multiple flows (for a given hop or number of hops), significant performance may be achieved for all flows. System performance is achieved by controlling the routing paths of multiple flows in a multi-hop, multi-flow wireless network, and applying traffic shaping in a systematic way, rather than relying on an opportunistic (i.e., randomly or independently optimized) approach.

20 Claims, 11 Drawing Sheets

FOREIGN PATENT DOCUMENTS

| | | |
|---|---|---|
| WO | WO2005/041516 A2 | 5/2005 |
| WO | WO2005/041533 A1 | 5/2005 |

OTHER PUBLICATIONS

W. Wang, S.C. Liew, and V.O.K. Li entitled "Solutions to performance problems in VoIP over a 802.11 wireless LAN," IEEE Transactions on Vehicular Technology, vol. 54, No. 1, Jan. 2005, pp. 366-384.

Coffey, Sean "WWiSE 11n Proposal Summary," IEEE 802.11-05/0273r0, Mar. 15, 2005, pp. 1-19.

Document IEEE P802.11e/D13.0, Part 11, Wireless LAN Medium Access Control (MAC) and Physical Layer (PHY) specifications: Amendment Medium Access Control (MAC) Quality of Service (QoS) Enhancements, IEEE P802.11e/D13.0, Jan. 2005, pp. 1-182.

Bormann, C., et al., "Robust Header Compression (ROHC): Framework and Four Profiles—RTP, UDP, ESP, and Uncompressed," RFC 3095, Jul. 2001, pp. 1-157.

"Pulse Coded Modulation for Voice Frequencies: ITU-T Rec. G.711," International Telecommunication Union, 1998, pp. 1-10.

Hisada, Y., et al., "Integrating system of QoS control technologies and its effect", 54th (first half of 1997) national meeting lecture papers (3) of Information Processing Society of Japan, Mar. 12, 1997, pp. 3-389 to 3-390 (2 pages).

International Search Report of International Application No. PCT/US06/35969, 2 pages.

Written Opinion for International Application No. PCT/US06/35969, 3 pages.

\* cited by examiner

METHOD FOR IMPROVING CAPACITY IN MULTI-HOP WIRELESS MESH NETWORKS

CROSS-REFERENCE TO RELATED APPLICATIONS

The present patent application relates to and claims priority to U.S. Provisional Patent Application ("Provisional Application"), Ser. No. 60/717,903, entitled "Method for Improving Capacity in Multi-hop 802.11 Wireless Mesh Networks by Jointly Using Routing Mechanisms and Traffic Shaping to Improve the Efficiency of Underlying Medium Access and Physical Layer Mechanisms", filed on Sep. 16, 2005. The Provisional Application is hereby incorporated by reference in its entirety.

BACKGROUND OF THE INVENTION

1. Field of the Invention

The present invention relates generally to wireless networks with multiple wireless stations ("WSs") and access-points ("APs"). More specifically, the present invention relates to multi-access wireless networks with a number of data and media applications, including voice applications. Traffic on such a network may be sent over multiple wireless links towards its destination 2. Discussion of the Related Art In multi-access networks, such as 802.11 networks, inherent inefficiencies exist in channel (medium) access and wireless transport in the lower layers. Often such inefficiencies arise out of the adhoc and multi-access nature of such networks. 802.11 networks are multi-access networks based on a carrier-sense multiple access (CSMA) scheme. In supporting real-time traffic, for example, the CSMA scheme has inefficiencies in the mechanisms in both the medium access control (MAC) and physical (PHY) layers. Such inefficiencies are particularly significant when the data packets have small payloads or have certain statistical characteristics in their real-time behavior. One example is the two-way constant bit-rate transmission of voice (e.g. in a voice over internet protocol ("VoIP") applications). In VoIP, the voice traffic is transmitted at a bit rate generally of less than 64 kb per second in each direction, with an average packet interval between 10 to 30 milliseconds. In a typical VoIP application, the payload in each data packet varies from a few bytes up to about 240 bytes.

The inefficiencies significantly reduce system throughput or the number of users or calls that can be supported. In the detailed description below, the term "system capacity" refers to both the number of users or calls supported and the system throughput. One source of inefficiency is the MAC-PHY overheads incurred at each access to the medium. For a given bit-rate, a smaller packet size results in more frequent accesses to the wireless medium. Thus, even at maximum inter-packet intervals (e.g., around 30 msec), a single 802.11 access-point with an 11 Mb/s physical layer (PHY) may reach its capacity limit supporting only 13 two-way voice calls, especially when a distributed contention scheme (e.g., the CSMA scheme) is used. For voice traffic under ITU-T Rec G.711, the 11 Mb/s PHY layer achieves only a 0.97 Mb/s (i.e., ((280×8)/0.03)×13=0.97 Mb/s) effective voice payload data transmission rate[1], representing an effective capacity utilization rate of 8.82% of the potential 11 Mb/s PHY layer.

[1] In this example there are also overheads in the 802.11 payload of IP, UDP and RTP headers (40 bytes total).

In a single-user (or single-call) single-hop system, improvement to MAC-PHY layer efficiency is limited. FIG. 1 shows a single mobile terminal (MT) communicating directly with a single gateway access point (GAP). While the MT's MAC-PHY protocol layers and the GAP's MAC-PHY protocol layers include some flow control mechanisms (e.g., buffering and bursting a single flow or performing class differentiation across multiple flows with different priorities), the improvements achieved by such mechanisms are limited. Techniques that are applicable on a per-flow (or per-class-of-flow) basis mitigate short-term traffic fluctuations and favor high-priority flows (with less performance for low-priority flows) under a limited system capacity. Such techniques are primarily concerned with quality-of-service (QoS) tradeoffs between or within flows. These mechanisms are also opportunistic, rather than well-designed processes of general application. To take advantage of a contention-free (burst) MAC/PHY mechanism, for example, the traffic arrivals and channel access opportunities must be well-matched. If a single flow does not have bursty arrival statistics, the burst MAC-PHY mechanism provides no advantage, or works only when the arrival statistics are modified by additional delay elements.

In a multi-user (or multi-flow) multi-hop system with multiple APs, where voice data traverse more than one wireless link (hop), single-user single-flow techniques may still be applicable on a per-user and per-hop basis. Even though such a simple (per-user, per-hop, per-flow) approach has some advantages in system design and complexity, poor performance may result in networks (meshes) of APs interconnected via their wireless interfaces.

A presentation by Locust World in the Voice over Net (VON) Conference held in San Jose during the week of Mar. 7, 2005 disclosed "speech servers" used within a mesh of 802.11 APs. As mentioned above, voice is not known to be friendly traffic for a network. One approach to improve voice traffic performance is to provide substantial radio resources. Alternatively, as disclosed by Locust World's presenter, nodes can act as speech switches to concentrate speech traffic along certain routes, so as to limit the effects that speech may have across the entire network. Such an approach overlays a sub-network within the mesh and concentrates voice traffic to the "speech servers," Tunneling, which is a form of aggregation, may be used in conjunction with this approach. However, these "speech servers" are static—i.e., the routing does not adapt, nor take advantage of the non-speech server traffic. Nor does the speech servers optimize by using information about the MAC-PHY performance. There is no mention of traffic aggregation for the speech servers.

Packet aggregation alleviates the large header overheads associated with the different layers of the ISO standard. In real-time protocol (RTP) multiplexing, for instance, multiple RTP streams are encapsulated in a single RTP payload, which is then transmitted between two end points (e.g., IP telephony gateways). The Internet draft proposal "Tunneling multiplexed compressed RTP (TCRTP)," available as draft-ietf-avt-tcrtp-08.txt from the internet archive of the Internet Engineering Task Force (IETF), describes improving bandwidth utilization in RTP streams by combining compression, multiplexing, and tunneling protocols over a network path. Compression reduces the IP/UDP/RTP header overhead of a single RTP stream. Tunneling transports compressed headers and payloads through a multi-hop IP network, without having to decompress and re-compress at every link. Multiplexing reduces the tunnel headers overhead by amortizing a single tunnel header over many RTP payloads. Using that method, multiple RTP streams are multiplexed into a single RTP packet until either a predetermined packet size (in number of bytes or number of payloads) is reached, or a timer expires. The optimal value for the packet size or the timer duration depends upon the required data rate and the acceptable delay in the network. Similar flow aggregation techniques are used in VoIP over ATM networks ("VoATM") and VoIP over MPLS ("VoMPLS") networks. Because voice packets can be very small (e.g., a few bytes) and ATM cells have a minimum size (i.e., 48 bytes), multiplexing voice packets into a single ATM cell improves bandwidth utilization. Up to now, however, RTP multiplexing is limited to single-destination hosts within a wired IP network The paper entitled "Solutions to performance problems in VoIP over a 802.11 wireless LAN," by W. Wang, S. C. Liew, and V. O. K. Li, in the IEEE Transactions on Vehicular Technology, Vol. 54, No. 1, January 2005, addresses low capacity in wireless 802.11 networks. The authors propose to multiplex downlink voice streams at a voice gateway into a single larger packet, which is then multicast to all receivers in a single transmission. FIG. 2 illustrates their proposed solution. In this proposed solution, security is achieved by encrypting the voice packets. The multiplexer replaces the IP/UDP/RTP header of each voice packet by a compressed mini-header that identifies the RTP session with a packet identifier (ID). Each receiver uses the packet ID to extract its voice packets from the multiplexed packet and restores the original headers.

The multiplex-multicast approach also solves the asymmetry problem between uplink and downlink communications in the last hop (i.e., the AP does not have to contend for the channel at least as many times as there are voice packets to transmit). However, this solution is not readily applicable to a multi-hop wireless network, as no broadcast takes place at the intermediate hops. The intermediate hops are often where bottlenecks occur. Calls may be forwarded through one or several relay nodes (access points or wireless routers) before reaching the voice gateway and other local calls may try to connect to the APs along the way. With multiple APs transmitting to the gateway, congestion can quickly build up. Multicast techniques are not applicable to multi-hop networks and are generally downlink-only mechanisms at terminating links.

Proposals for frame aggregation at the MAC/PHY layers of a wireless medium and for capacity-increasing bursting mechanisms have been received at Task Group N (TGn) of the 802.11 Standard. One proposal from Worldwide Spectrum Efficiency (WWiSE) aggregates frames at the PHY layer using signal fields to separate multiple MAC Protocol Data Units (MPDUs) within a PLCP Protocol Data Unit (PPDU). WWiSE also recommends using a bursting mechanism within the 802.11e Standard, where PPDUs are sent in succession on the wireless channel within RIFSs (reduced interframe spaces) of each other. A proposal from the TGn Sync Group (TGnSync) conducts frame aggregation at the MAC layer or at the interface between the MAC and the PHY layers. Under that proposal, MPDUs are aggregated into one PLCP Service Data Unit (PSDU) with MPDU delimiters located at the beginning of each MPDU. The proposal also aggregates multiple MAC Service Data units (MSDUs) into one MSDU, to allow sharing of the MAC header and the CRC bits. The WWiSE and TGnSync proposals improve MAC and PHY layer (i.e., Layer 2) efficiency.

Some additional mechanisms are used in the MAC-PHY layers. For example existing 802.11a/b/g systems do not aggregate payloads within the MAC-PHY layers. For a large payload that exceeds the MAC payload limit, a segregation or fragmentation algorithm transmits fragments of the payload onto the wireless channel in a bursty fashion separated by small inter-frame space (SIFS) intervals. The 802.11e standard has a bursting mechanism at RIFS intervals used during contention periods. The bursting mechanism is limited, however, to transmitting fragments of the same MSDU.

As with the multiplex-multicast approach, these mechanisms fall into the class of per-hop techniques and while they can help performance in multi-hop scenarios by improving the efficiency of individual links, they do not fully address issues or potential improvements that can occur in multi-hop environments.

There is also work on improving performance in multi-hop scenarios. However, earlier wireless multi-hop routing protocols, such as (AODV, DSR, DSDP, TORA), treat the routing problem independently from the lower (e.g. MAC/PHY) layers. These protocols perform path discovery in a best-effort fashion, without guarantees or consideration for system performance or Quality of Service (QoS). These protocols serve mainly mobile ad-hoc networks (MANET), where finding a connected path has high priority. However, modem networks are primarily static (i.e., wireless relays are stationary and connectivity is guaranteed). More importantly, 802.11 networks have high overhead and routing protocols that do not address these overheads have poor system performance. Some networks incorporate path cost metrics to measure the insufficient resources in the lower layers, and make routing decisions according to the metrics.

More recently, some researchers consider routing in wireless networks in conjunction with resource allocation in lower layers. The result is a combined routing and MAC/PHY layer mechanism that provides optimal network operations. Similar approaches are also used in wireless sensor networks, which are more application-specific and amenable to further optimization. However, many of these routing algorithms rely on assumptions that are not applicable to 802.11 protocols.

Existing solutions do not exploit the operational capacity of 802.11 networks. Transport capacity of 802.11 is highly inefficient because each packet has contention, transmission and acknowledgement overheads.

SUMMARY OF THE INVENTION

According to one embodiment of the present invention, net wireless access efficiency is improved in a multi-hop, multiple-flow network by optimizing multi-flows over the entire network. This approach also benefits individual flows. These mechanisms apply joint routing and traffic-shaping techniques to multiple-flows at intermediate hops. Even though the routing and traffic-shaping techniques may adversely affect flows at some hops, when averaged over multiple hops (for a given flow) and over multiple flows (for a given hop or number of hops), significant performance may be achieved for all flows. The present invention therefore addresses more inefficiencies and takes greater advantage of multi-hop paths than per-hop techniques.

The present invention improves system performance by controlling the routing paths of multiple flows, so as to perform additional traffic shaping in a systematic way, rather than relying on an opportunistic (i.e., randomly or independently optimized) approach as in the prior art. In a multi-hop environment, a method of the present invention has the added advantage of transparency to both the originating application (Application Layer) and terminating application (Application Layer).

According to one embodiment of the present invention, traffic is concentrated along selected routes, not by concentrating traffic at pre-configured server points inside the wireless mesh using an orthogonal routing protocol, but by jointly making routing decisions and applying traffic shaping techniques over multiple flows. Both routing paths and traffic shaping techniques are allowed to adapt as conditions (traffic entering) in the network changes. Both static and dynamic routing paths and traffic shaping techniques may be applied.

The relevant traffic shaping and routing of the present invention is based on the underlying MAC-PHY dependencies on traffic statistics. Unlike wired networks or wireless networks that mimic wired counterparts, in a wireless CSMA environment, concentrating traffic at certain routers does not necessarily create a bottleneck. In such an environment, different routes can share the same underlying transmission medium. In addition, system capacity may increase with proper traffic shaping, if capacity constraints at earlier relaying stages are not violated.

The present invention is applicable to a multi-user environment with multiple flows in which WSs and APs are connected to each other through wireless MAC/PHY mechanisms. A combination of routing and traffic-shaping (at higher level layers) over many flows influences the joint traffic statistics, resulting in improved or modified system performance (as measured by system capacity and end-to-end delay). The present invention may be implemented without modification to existing MAC/PHY designs and is transparent to the application layer.

One embodiment of the present invention is applicable to a network that includes multiple 802.11 access points (APs) and wireless routers (WR). Access points are devices that serve the end-points (e.g., mobile terminals (MTs)). In the network, WRs interconnect different APs and WRs. (WRs may also serve as access points for MTs; in the following description, unless otherwise noted, no distinction is made between WRs and APs). In addition, although not necessary, one or more gateway access points (GAPs) may be provided to connect the wireless network to one or more external (possibly wired) networks. (The detailed description uses GAPs to illustrate a common destination point for multiple flows.) In one embodiment, some flows go through two or more hops (i.e., wireless links) on their way to their final destination. The APs, WRs and GAPs communicate over wireless links that are sensitive to the underlying statistics of traffic (e.g., inter-packet durations, the number of accesses to the medium, the burst nature of the traffic). Communication between MTs and other devices may use such wireless links.

To minimize capacity or performance loss across the network, routing and traffic shaping are applied based on the underlying MAC-PHY mechanisms within the relevant MTs, APs, WRs or GAPs. In one embodiment, the joint mechanism is based on three underlying technique classes: (a) routing mechanisms; (b) traffic shaping mechanisms (changing the statistics of transmitted traffic) above the MAC-PHY layers; and (c) mechanisms or capabilities in the MAC-PHYs present in the network.

According to the present invention, a method for increasing wireless network efficiency includes: (a) providing multiple access points to the wireless network; (b) assigning multiple mobile terminals to access the wireless network through the access points according to network conditions including the traffic statistics of data packets of the mobile terminals; and (c) shaping traffic flows from the mobile terminals at a protocol level above the medium access control layer. The access points, which include wireless routers, are organized in a hierarchical configuration, according to the number of wireless routers available, aggregation at each wireless router, and the maximum number of mobile terminals to associate with each wireless router. The goal of the configuration is to direct traffic flows between the mobile terminals and the gateway access point.

In one embodiment, the wireless network includes a gateway access point that sends and receives traffic flow to and from the MTs. In that embodiment, decisions are made whether to send a traffic flow directly to the gateway access network (with one hop) or alternatively through one or more wireless routers. Some decisions may be constrained (e.g., based on connectivity among MTs and wireless routers). However, often, many different decisions can be made based on considerations including quality of service constraints, the wireless routers present and the traffic-shaping capability of one or more wireless routers. In fact, the method also includes determining activating or deactivating a wireless router in response to a mobile terminal requesting to join the wireless network.

The key insight is that though sending a traffic flow over more than one link, even when it can go directly to the GAP may appear to be less efficient, a per-flow or per-hop analysis misses the joint effects this traffic flow may have on other flows, and vice-versa. In fact, such joint effects can change the overall network behavior in a way that even for the traffic flow that is given the advantage of one-hop to the GAP, performance may in fact be worse than if the traffic flow is routed through multiple hops (i.e., routers) on its way to the GAP. In an extreme case, a one-hop connection may in fact push the system past the limit of traffic capacity it can support severely affecting all connections whereas a two (or more) hop connection enables traffic shaping which may allow the system to stay below that capacity limit.

Traffic shaping under the present invention may include buffering in conjunction with a hold-and-release mechanism which shapes the timing characteristics of data arrival at the medium control layer. The hold-and-release mechanism releases data packets to the medium access control layer according to the input traffic statistics of data packets buffered and the desired output traffic statistics. The traffic statistics desired may adapt to the overall network condition and may relate to one of: (i) the flows having packets buffered, (ii) type or class of each flow having data packets buffered; (iii) the occupancy of buffers; and (iv) arrival times of each data packet.

The data packets are released to the medium control layer or the physical layer at each wireless router to achieve a traffic characteristic that allows the MAC/PHY to behave more efficiently. For example, if packets are released in groups then a MAC/PHY bursting scheme (if supported) can be used to transmit the data into the communication medium more efficiently. Traffic shaping may also include aggregating the data received, based on flows or at the packet level including aggregation within a flow or across multiple flows, into fewer packets or flows The ability to perform these operations, and to influence both per-hop and multi-hop efficiency in the network, depends on the types of flows that are routed to the wireless routers. Specifically, the output traffic flow characteristics depend on the input traffic flow characteristics. Similarly, the joint effect to overall network efficiency depends on which traffic flows and what traffic shaping techniques are implemented in the wireless routers.

The decisions on routing and traffic shaping therefore consider this joint dependency, which can be understood through investigations involving actual networks or simulated networks.

The present invention is better understood upon consideration of the detailed description below in conjunction with the drawings.

BRIEF DESCRIPTION OF THE DRAWINGS

To facilitate cross-referencing among the figures, like elements in the figures are assigned like reference numerals.

DETAILED DESCRIPTION OF THE PREFERRED EMBODIMENTS

Figure 7:
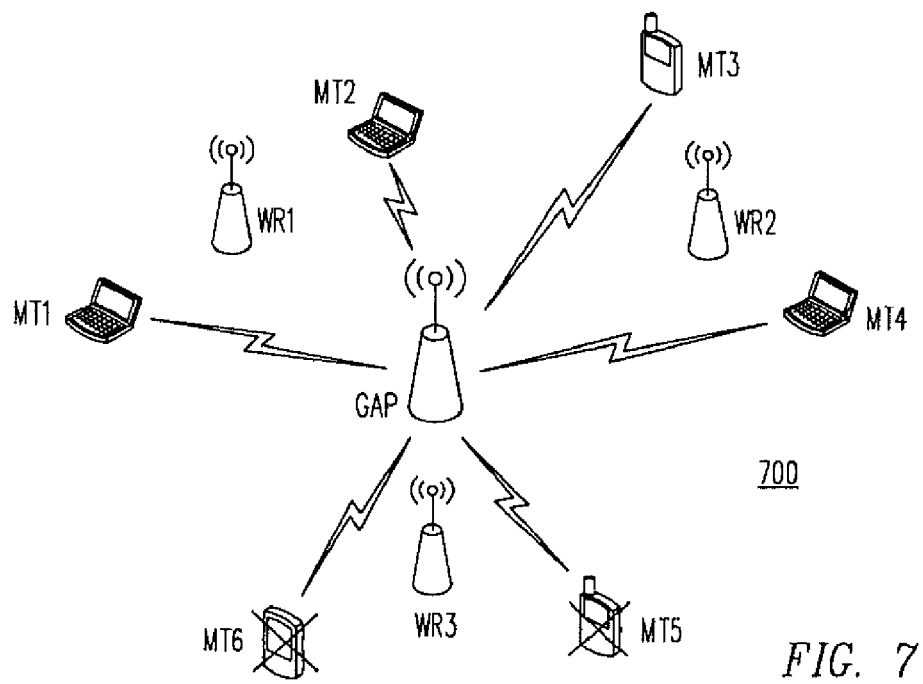
FIG. 7 shows a network 700 in which multiple mobile terminals MT1-MT6 obtain service directly from a gateway access point (GAP).

The present invention improves net wireless access efficiency in a multi-hop, multiple-flow network by optimizing multi-flows over the entire network. The present invention routes and shapes traffic to improve efficiency, considering all traffic and all paths. FIG. 7 shows a network 700 in which multiple mobile terminals MT1-MT6 obtain service directly from a gateway access point (GAP). This configuration is referred to in this detailed description as "single-hop multi-flow network." In FIG. 7, the GAP may be capable only of servicing MT1-MT4 before service quality degrades significantly.

Figure 8:
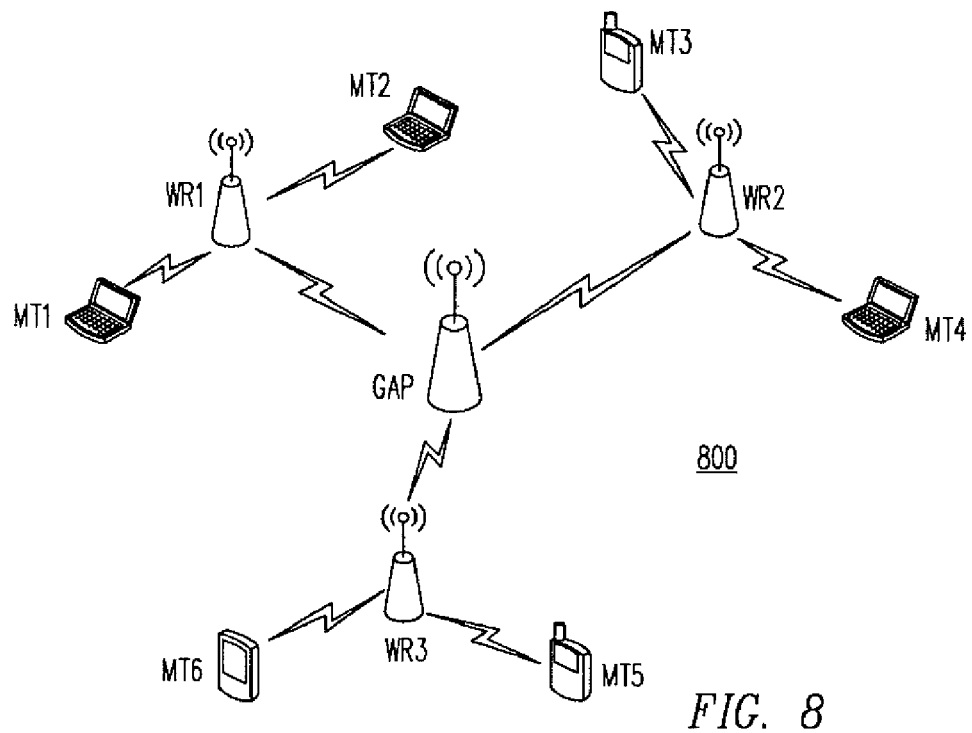
FIG. 8 shows a network 800 in which multiple mobile terminals MT1-MT6 obtain service from wireless routers WR1-WR3, each of which accesses a gateway access point (GAP) over a wireless link.

The present invention takes advantage of a capacity increase made feasible by using both relaying and traffic shaping. FIG. 8 shows a network 800 in which multiple mobile terminals MT1-MT6 obtain service from wireless routers WR1-WR3 ("relay nodes"), each of which accesses a gateway access point (GAP) over a wireless link. In FIG. 8, by routing the traffic to and from MT1-MT6 through WR1-WR3, and aggregating the traffic at intermediate WRs, the overall system capacity is increased, even though the same amount of traffic contends for the same channel to access the GAP. Unlike network 700 of FIG. 7, MT1-MT6 of FIG. 8 are all provided better service because the longer packet transmission times, due to the longer payloads of the aggregated packets, is more than compensated by the reduced protocol overhead and channel access contention for the transmissions between the WRs and the GAP. The appropriate trade-off between the packet length and GAP access contention may be obtained via offline simulation or online empirical measurements. Priority may also be assigned to specific flows or traffic type.

Figure 9:
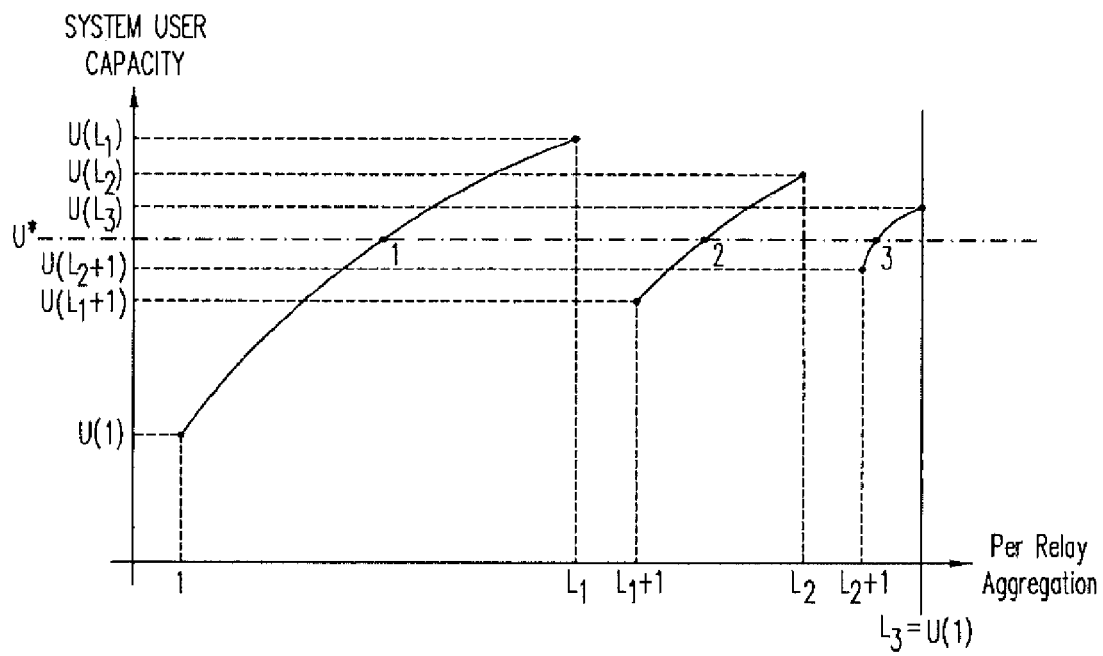
FIG. 9 shows offline measurements of total system capacity (in number of user flows) as a function of aggregation for three different relay strategies.

FIG. 9 shows offline measurements of total system capacity (i.e., the maximum number of user flows) as a function of aggregation performed for three different relay strategies. FIG. 9 may be obtained for homogeneous VoIP traffic, in which all calls follow a constant bit-rate (CBR) pattern (e.g., 64 Kbps data rate). The inter-packet duration at each MT is 30 msec. At 64 Kbps, this duration corresponds to 240 bytes of transmission time. Each packet carries overheads of an IP header (20 bytes), a UDP header (8 bytes) and an RTP header (12 bytes). Similar plots may be obtained with heterogeneous traffic and variations in other parameters (e.g., data rates, overheads, or IP networks).

The x-axis of the plot in FIG. 9 indicates the number of voice calls $L_k$ to be aggregated by a WR into a single flow using a larger packet size. An aggregated packet is complete, for example, when (a) all packets received during a pre-determined time period are aggregated; (b) a pre-determined number of packets are received from each MT associated with the WR and aggregated; or (c) packets are received and aggregated from a pre-determined number of MTs associated with the WR. Of course, any variation or combination of (a), (b), and (c) are within the scope of the present invention.

To illustrate, assume that one packet from each call supported by a given WR is aggregated. For an aggregation of "L" at each WR (i.e., each WR aggregates L calls), the number n(L) denotes the number of WRs that can be supported by a GAP. Under a two-hop network (e.g., network 800 of FIG. 8), the total system capacity U(L) is given by:

$$U(L)=n(L)\times L$$

Note that system capacity increases with aggregation: i.e., $U(1) \leq U(L)$ for $L>1$. In other words, using intermediate WRs increases the number of users (MTs) that can be supported by a GAP. Conversely, when the number of users in the system is known, FIG. 9 determines the possible aggregation operating points for a given target U* for each of the relaying strategies. There can be many combinations of aggregation levels or number of WRs that can achieve or even exceed that capacity. For instance, different aggregation levels at different WRs ("unbalanced" strategies) may exceed the capacity values shown in FIG. 9. The selection of the strategy to use may then be further evaluated using additional criteria, such as end-to-end delay, power, geographical proximity, channel quality, and user profiles. An operating point may be used to determine (a) the number of WRs to use; (b) whether an MT entering the network should obtain service through a WR or directly through a GAP; and (c) the aggregation at each WR and the maximum users to associate with each WR and directly to a GAP.

Furthermore, note that FIG. 9 provides bounds on capacity and also then by nature provides information on many other operational points. Specifically, a network can always operate under that capacity and this may in fact be desirable in order to maintain headroom for new traffic and/or maintain quality of service. For example if a capacity is reached using aggregation level "L" at each of "m" WRs, then it is also possible to use "m" WRs yet operate for some "m1<m" WRs at an aggregation of level "L1"<L. Similarly, it is also possible to use "m2"<m WRs, each of which is operating at (a potentially different) aggregation level less than or equal to "L".

Other operation characteristics that are not demonstrated by FIG. 9, for example, cases where some routers use more than aggregation level "L", can be investigated and noted for their ability to handle the network load and/or achieve the desired quality of service.

For networks of a greater degree of hierarchy (i.e., greater than 2 hop), the GAP in network 800 of FIG. 8 may be seen as a WR. A number of such second-level WRs may be interconnected or connected to another GAP. The measurements of FIG. 9 may be extended to a multi-GAP network.

The present invention is also applicable to a network of mixed hierarchy: i.e., a network like network 800, with some mobile terminals being directly connect to the GAP. Such a configuration, as in a configuration like network 800, is referred to in this detailed description as a "multi-hop, multi-flow network." The WRs, MTs, APs and GAPs may communicate, for example, in ad-hoc or infrastructure mode under any of the 802.11 standards. To avoid interference and to have full-duplex operation, each WR may carry multiple 802.11 interfaces that operate on different channels or different standards that occupy different frequency spectrum (e.g. 802.11a and 802.11b). The interfaces communicate with the MTs and the GAPs.

Unlike RTP multiplexing, which has mainly served single-destination hosts within a wired IP network, the present invention improves system throughput in wireless multi-hop IP networks by aggregating and, more generally, traffic shaping multiple flows from possibly different users and different destinations. Further, unlike tunneling in the prior art, with benefits on a per-link basis, a method of the present invention uses multiple routers (through routing decisions) to perform aggregation services, so as to achieve higher bandwidth utilization for the entire network. The present invention is also different from prior art proposals which try to make the MAC and PHY layers more efficient. The methods of the present invention operate on Layer 2 mechanisms and above, applying traffic shaping and routing mechanisms to existing MAC and PHY layers.

According to one embodiment of the present invention, any access-point can be seen as a "speech server" with a routing strategy (independent of tunneling) that uses intermediate hops to modify statistics. However, the prior art routing strategy that only gets traffic to flow along speech servers does not benefit from multi-hop aggregation, or from activating intermediate hop nodes. The present invention aggregates both uplink and downlink voice streams at specific wireless routers to relieve congestion and to increase voice capacity over multi-hop 802.11 networks. Aggregation, including header compression and multiplexing, increases bandwidth efficiency. The wireless routes are feasible flow paths between the wireless end hosts and the wired access points of WLANs. Performing routing in conjunction with traffic aggregation and packet reformatting (i.e. modifying the packet headers) reduce inefficiencies significantly.

Figure 3:
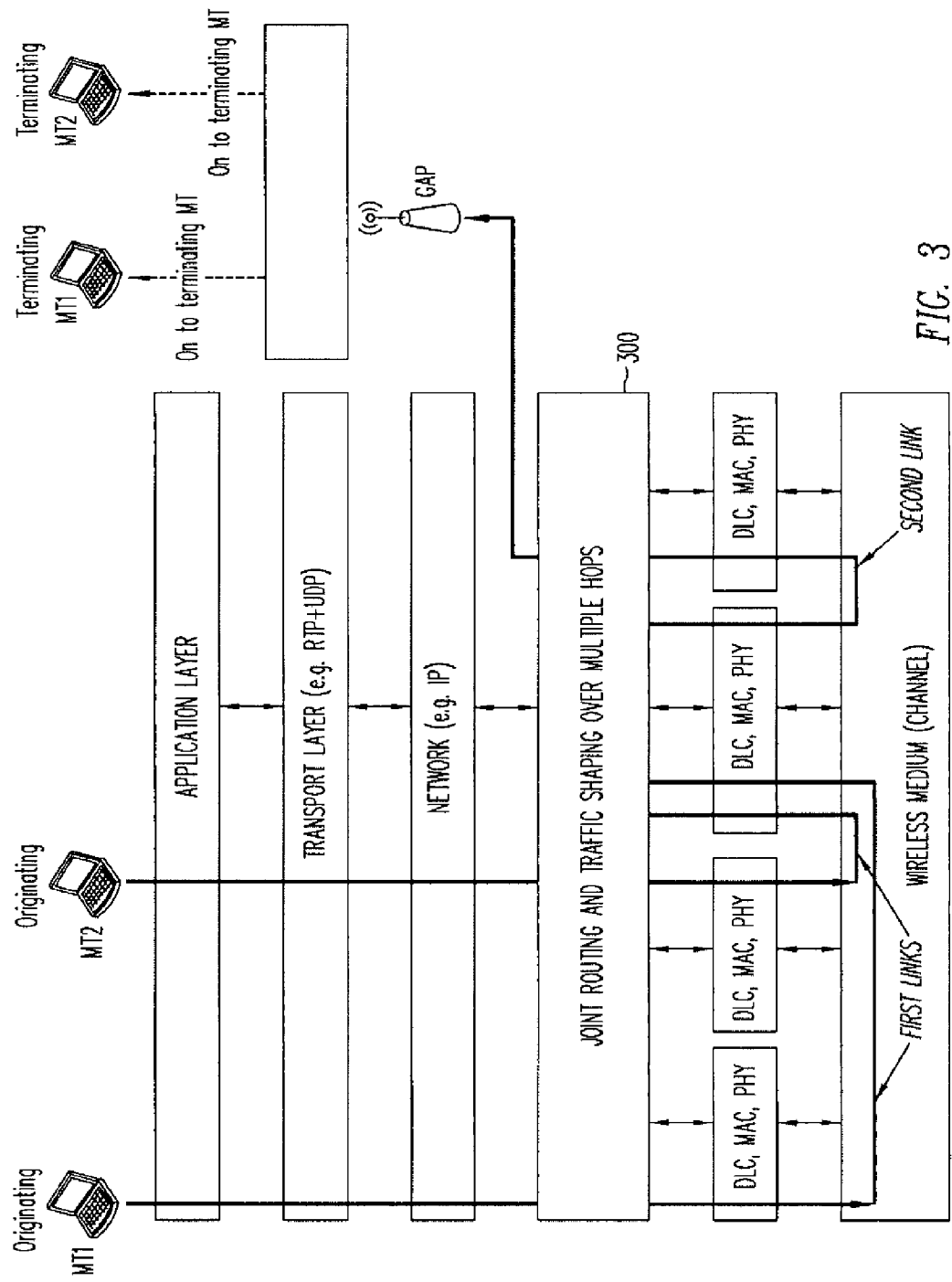
FIG. 3 shows routing and traffic shaping being performed by mechanism 300 between the network layer and the MAC/PHY layers at intermediate hops between mobile terminals MT1 and MT2 and gateway access point GAP for uplink traffic, in accordance with one embodiment of the present invention.
Figure 4:
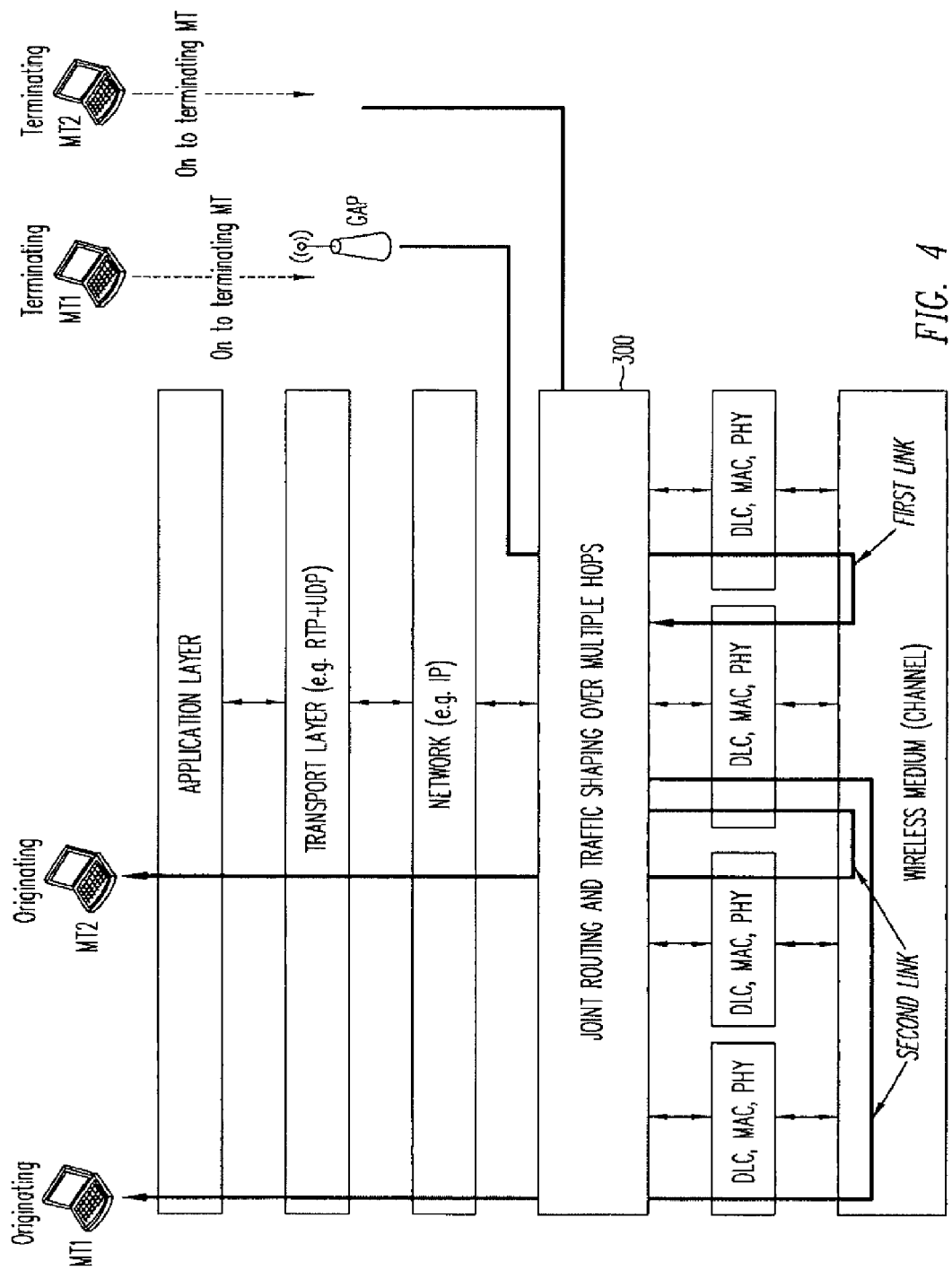
FIG. 4 shows routing and traffic shaping being performed by mechanism 300 between the network layer and the MAC/PHY layers at intermediate hops between mobile terminals MT1 and MT2 and gateway access point GAP for downlink traffic, in accordance with one embodiment of the present invention.
Figure 5:
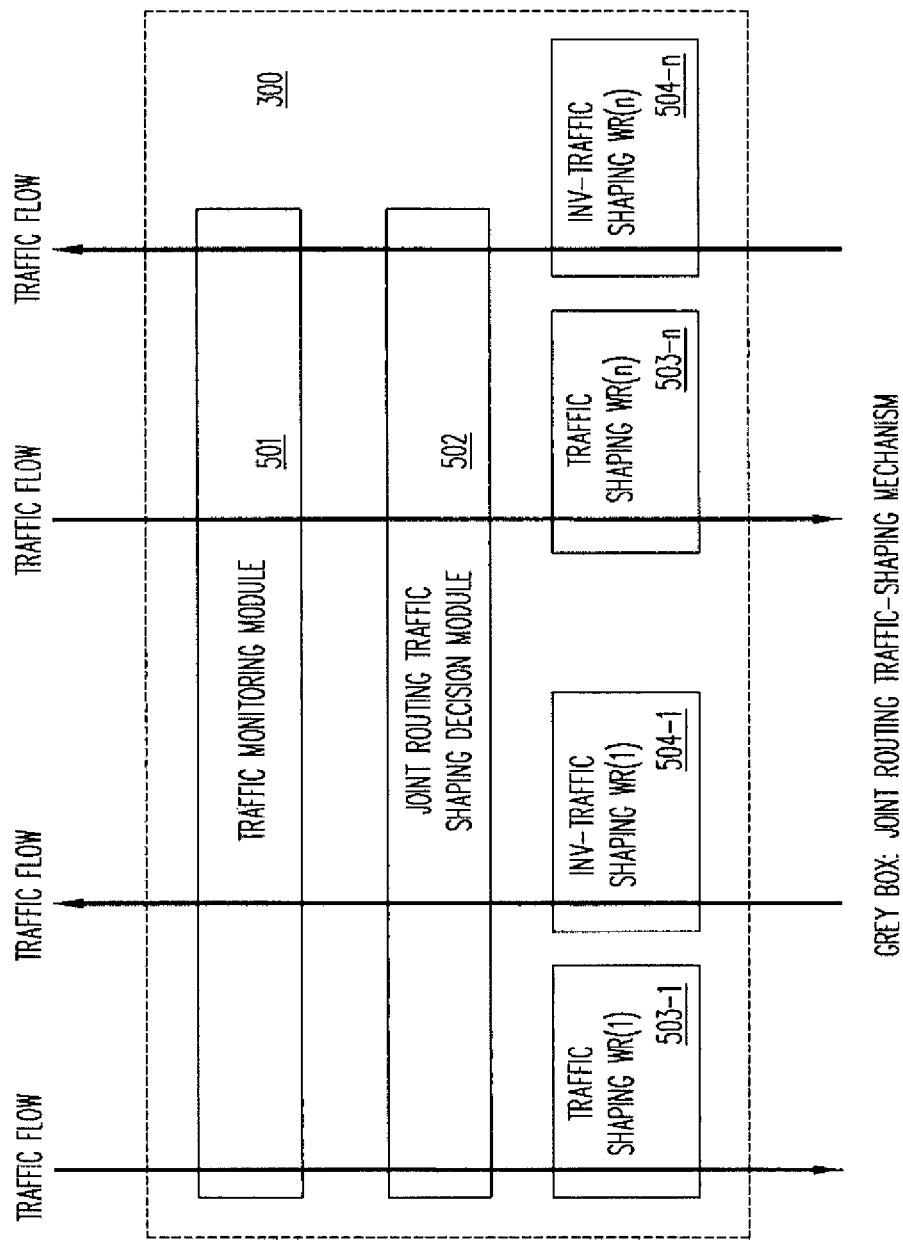
FIG. 5 shows mechanism 300 of FIGS. 3 and 4 in greater detail.

FIGS. 3 and 4 show routing and traffic shaping being performed by mechanism 300 between the network layer and the MAC/PHY layers at intermediate hops between mobile terminals MT1 and MT2 and gateway access point GAP for uplink and downlink traffic respectively. FIG. 5 shows mechanism 300 of FIGS. 3 and 4 in greater detail. As shown in FIG. 5, mechanism 300 includes traffic monitoring (TM) module 501, joint routing and traffic shaping decision (JRTD) module 502, traffic shaping (TS) modules 503-1, 503-2, ..., 503-n and traffic shaping inversion (TSI) modules 504-1, 504-2, ..., 504-n.

TMM 501, which is common to all MTs, APs/WRs, and GAPs, monitors both network conditions (e.g. channel conditions and link quality) and the data traffic. JRTD module 501 receives input from TMM 501 to determine the actions to be taken by the TSI modules and the routing of flows across the network. JRTD module 502 may also determine MT-AP associations, and whether or not an additional WR should be activated. The joint decision on both routing and traffic-shaping across the network takes into consideration the performance dependencies of underlying MAC-PHY mechanisms on the joint statistics of flows. JRTD module 502 optimizes individual MAC/PHY layer performance taking into consideration the multiple-hops and the multiple flows in the network, and in a manner that is transparent to higher level layers (e.g., the application layer).

Each of TS modules 503-1, 503-2, ..., 503-n reside in a selected AP, WR or GAP, and may perform aggregation and packet buffering. In one embodiment, each TS module may aggregate packets across multiple flows into a single packet, so as to reduce the number of channel accesses in the intermediate hops (links), thereby increasing the capacity on that link and reducing delay in the network. Each TS module may buffer packets and subsequently release them according to a predetermined statistical time profile of the processing at the corresponding MAC-PHY layers. Although buffering may delay some packets, the average delay across all packets may be reduced, because the MAC-PHY layers can take advantage of a contention-free bursting mechanism (i.e., sending multiple packets based on a single access grant). The TS module may also apply other techniques to modify the timing of packet arrivals. For example, RTP-UDP headers may be compressed to reduce the raw bitrate (in kilo-bits-per-sec) of individual flows. The TS module may apply lossless compression of the data-payloads (e.g. using the Lempel Ziv algorithm). For voice data, the TS module may even apply lossy compression for certain flows. Bursting reduces network contention overhead (hence, also the average channel access contention overhead per packet) and increases network capacity in the network. TSI modules 504-1, 504-2, ..., 504-n are each provided at a selected AP, WR or GAP to reverse (when necessary) the aggregation of data packets.

Figure 1:
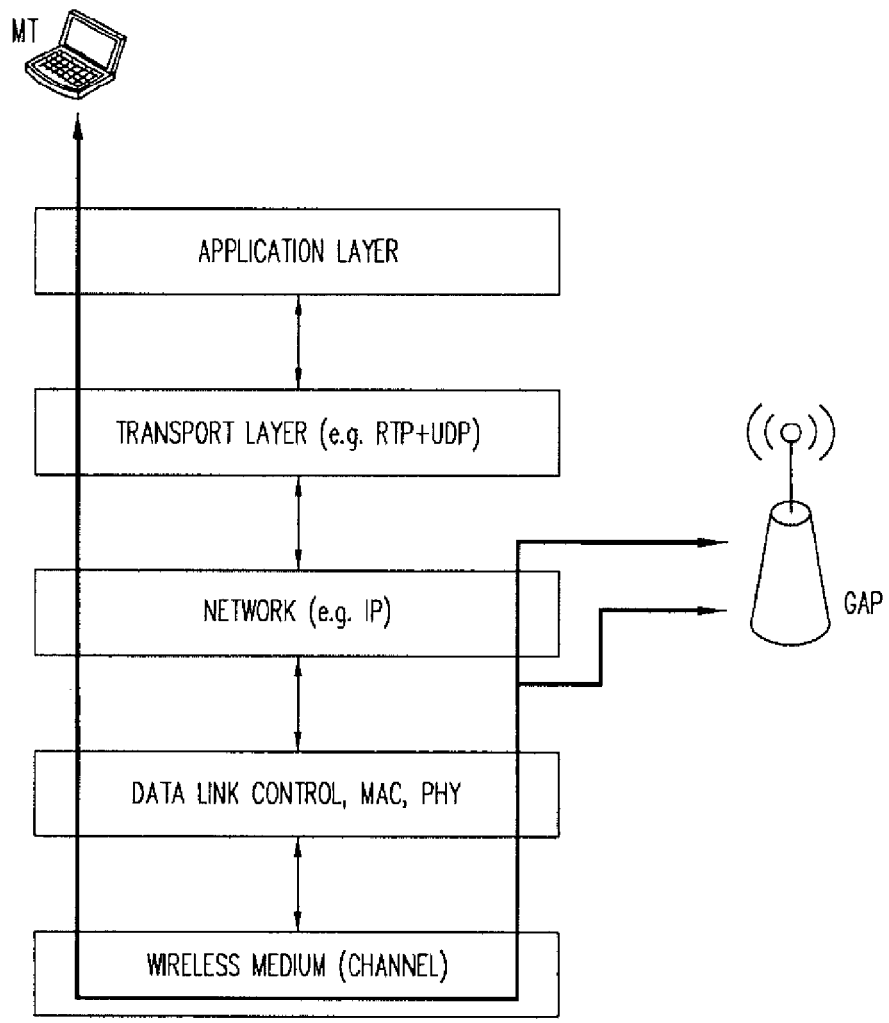
FIG. 1 shows a single mobile terminal (MT) communicating directly with a single gateway access point (GAP).
Figure 2:
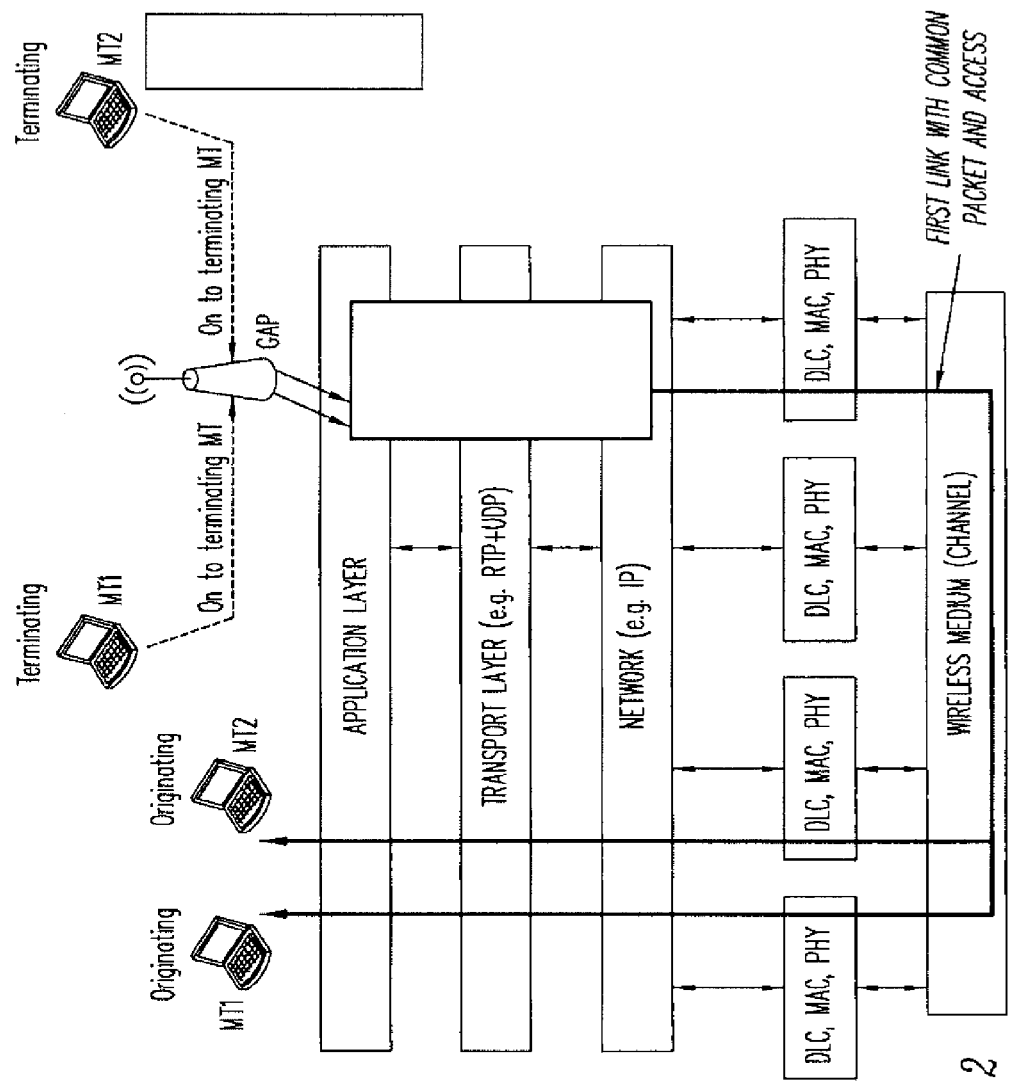
FIG. 2 illustrates one solution in the prior art, in which voice data from multiple mobile stations are multiplexed into a multicast packet, which is then transmitted to all receivers simultaneously.
Figure 6:
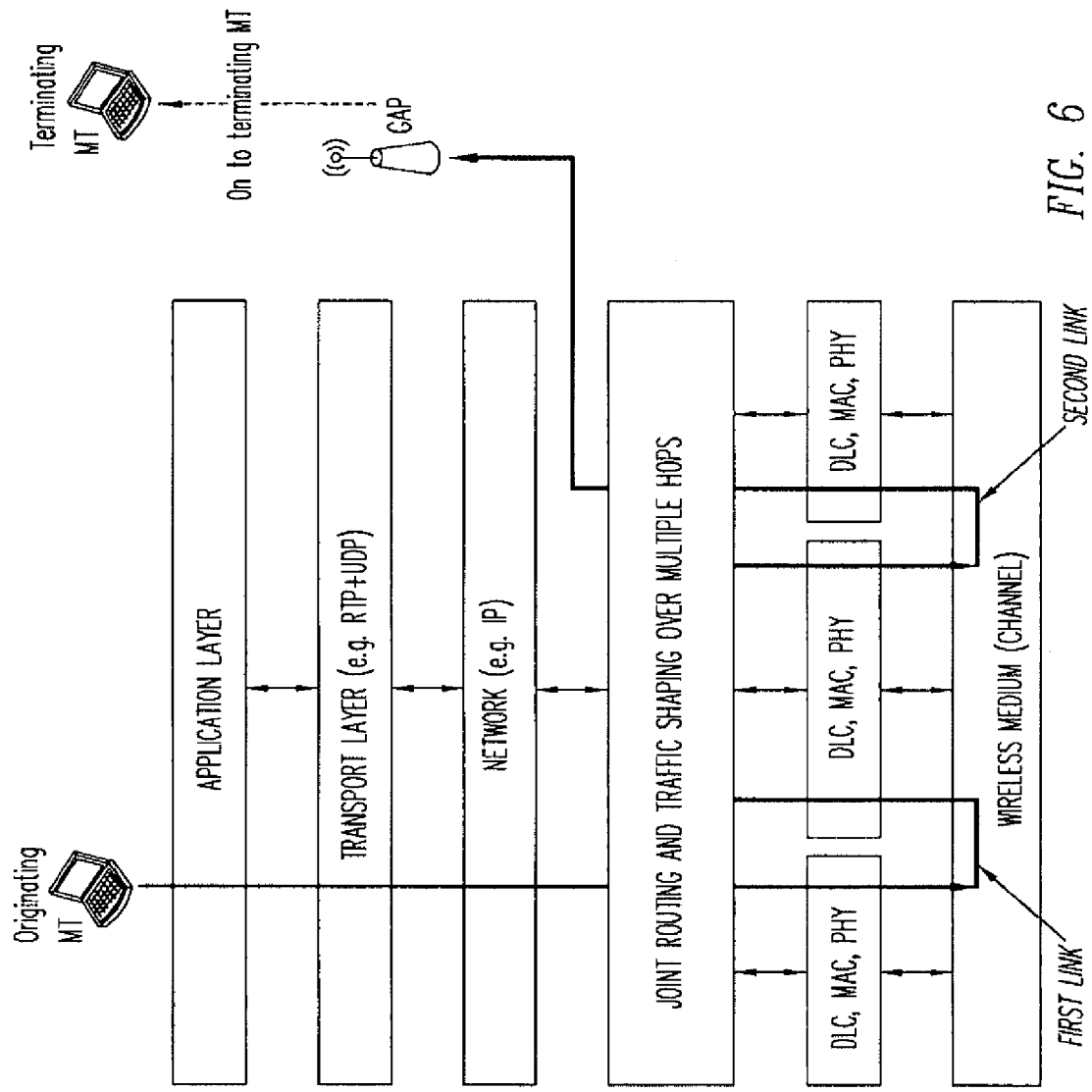
FIG. 6 shows a single-flow multi-hop network using joint routing and traffic shaping mechanism 300, in accordance with one embodiment of the present invention.

FIG. 6 shows a single-flow, multi-hop network using joint routing and traffic shaping mechanism 300, in accordance with one embodiment of the present invention. As shown in FIG. 6, channel access statistics at the second hop is modified using traffic shaping. Traffic shaping in this instance also affects throughput on the wireless medium which is shared by many network entities. However, as in FIG. 1, there is a limit on the statistics shaping, while maintaining transparency at the higher layers (e.g., the QoS requirements of the terminating application layer). Referring to each of FIGS. 3 and 4, a network having multiple hops and multiple users or flows enables aggregating two or more flows to a MAC-PHY device (e.g., the "Traffic Shaping 1" module in each of FIGS. 3 and 4) without affecting or violating the QoS constraints of any of the flows required by the terminating end-points MTs. (Note that a TSI module, e.g., that shown in FIG. 4, performs fragmentation of aggregated packets). Traffic shaping can occur as early in the flow as the first hop (FIG. 4) which is accessed by multiple users.

The present invention links routing decisions to traffic shaping across multiple flows. As JRTD 502 operates above individual MAC-PHY layers, it makes decisions taking into account the behavior of MAC-PHY layers, as represented by their traffic statistics. Traffic shaping directly influences the efficiency of the MAC-PHY layers, and routing influences the type and amount of traffic shaping to apply. Packet and flow aggregations may be facilitated by routing calls across the network to one or more common points. The joint statistical process in JRTD module 502 across many flows affects performance of the entire network, and on individual MAC-PHY mechanisms. For example, the bursting behavior within the flow and changes to that behavior are important parameters that affect channel access patterns, and the behavior of MAC-PHY mechanisms involved in the flow. In a multi-hop, multi-flow network, the joint flows are seen by the MAC-PHY mechanisms. Besides aggregation, adaptive delay elements (e.g., adaptive buffers) may be used to shape the joint traffic statistics. Other parameters including packet size and channel access patterns can also affect MAC-PHY mechanisms.

The GAPs and MTs generate different traffic types and characteristics (e.g., packet lengths and inter-arrival distributions). In the multi-hop environment, a GAP may connect to an MT through multiple APs and WRs, with each hop having a different traffic capability (e.g., link quality, MAC and PHY mechanisms). In a multi-flow, multi-hop network, there are links between MTs and WRs or APs, links between MTs and GAPs, links between WRs and APs, and links between WRs, APs and GAPs. Wireless links have underlying MAC-PHY mechanisms that are sensitive to traffic statistics. APs, WRs and GAPs may support a technique that changes the statistics of flows and thus transmission events.

One joint routing (including relaying) and statistical traffic shaping decision may include consideration for (a) flows that directly transmit to a GAP; (b) flows that transmit through a selected relay node, given (i) the QoS constraints (e.g. delay, jitter, and bandwidth) of each flow, (ii) the connectivity among MTs, WRs and GAPs, and (iii) the traffic-shaping capabilities of each wireless router, and (iv) the quality of each link.; and (c) the activation and de-activation of WRs.

One relaying decision may consider (1) the flows are directly transmitted to the GAP and (2) the flows are transmitted through a relay node in a two-hop fashion under the given (1) QoS constraints (e.g. delay, jitter, and bandwidth) of each flow and (2) traffic shaping capabilities of each wireless router. These decisions may be evaluated using metrics that measure, for example, system capacity maximization, number of supported voice calls, the net data throughput in the network, and average delay minimization. IP packets relayed by a wireless router may belong to different traffic flows originating from or terminating at the same or different MTs. WRs may perform traffic shaping by buffering IP packets, aggregating packets of different flows for the same destination (e.g. MT or GAP) or packets in the same flow. Once the WR gains medium access, the IP packets are transmitted by the MAC layer in one or more bursts without releasing the channel access between the bursts.

Figure 10:
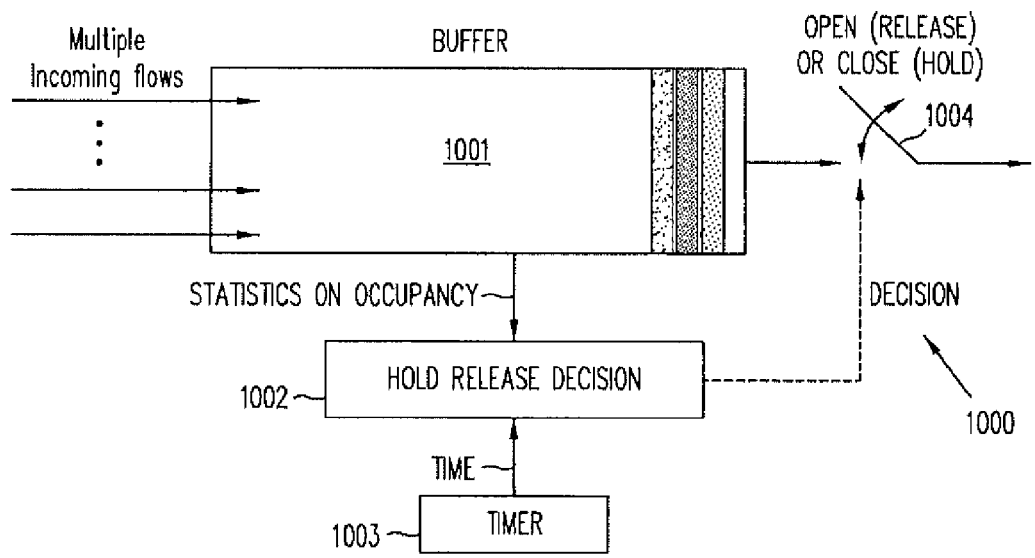
FIG. 10 shows schematically a buffering and hold-and-release decision mechanism 1000 that can be used to perform traffic shaping, according to one embodiment of the present invention.

FIG. 10 shows schematically a buffering and hold-and-release decision mechanism that can be used to perform traffic shaping, according to one embodiment of the present invention. This allows for both relative timing and technique changes (e.g., aggregation). As shown in FIG. 10, packets from multiple incoming are received into buffer 1001. A filtering circuit (not shown) collects statistics of the packets in buffer 1001 and provides the statistics to hold-and-release decision module 1002. At the same time, timer 1003 keeps track of the time elapsed since the last release. In one embodiment, the decision to hold packets or to release packets depends on both the statistics collected and expiration of a time limit. When released, the packets in buffer 1001 are sent to the underling MAC layer. The timing of the release may be constrained by the requirements of the accepting MAC layer. Typically, there are buffers in the MAC layer, so that the timing constraints from the MAC layer are not expected to be significant. The hold or release decision depends on (a) time and (b) statistics on the buffer occupancy, taking into consideration (i) the flows having packets in buffer 1001, (ii) the type or class of each flow; (iii) the number of packets in buffer 1001, and (iv) the arrival times of each packet. From the time perspective, the decision may take into consideration the duration that individual packets have spent in the buffer, or the time elapsed time since the last release or hold.

Mechanism 1000 creates a desired arrival statistic in time as seen by the MAC layer. This desired statistic may be selected and directed by JRTD module 502, or each traffic shaping wireless router 503-1, . . . , 503-n may simply operate semi-independently, making local optimizations under the constraints from JRTD module 502 and the given MAC-PHY layer. For example, the hold and release mechanism may maintain a policy that ensures the MAC layer (e.g., in an 802.11e) have multiple "speech"-class packets in the speech-class buffer before contending for channel access for that buffer. JRTD module 502 may set the number of flows and thus the best release criteria. Addition considerations may include: a) a maximum delay allowable in buffer 1001, or b) a maximum number of packets that can be held in buffer 1001. Alternatively, one or more buffers may be provided to service different subsets of flows. (e.g., traffic-class dependent buffers).

The hold-and-release buffer mechanism reduces channel access contention for a given flow class (in particular media flows) by sharing the contention overhead over multiple packets awaiting transmission in that class. The MAC-PHY layers using contention-free bursting (CFB) mechanisms further increase the efficiency in the underlying wireless medium. Although the hold-and-release buffer mechanism may increase the delay of individual packets, the average delay may be reduced because of reduced channel access contention. The reduced channel access contention may allow reducing the mean delay of contention-avoidance back-off counters used in CSMA.

Figure 11:
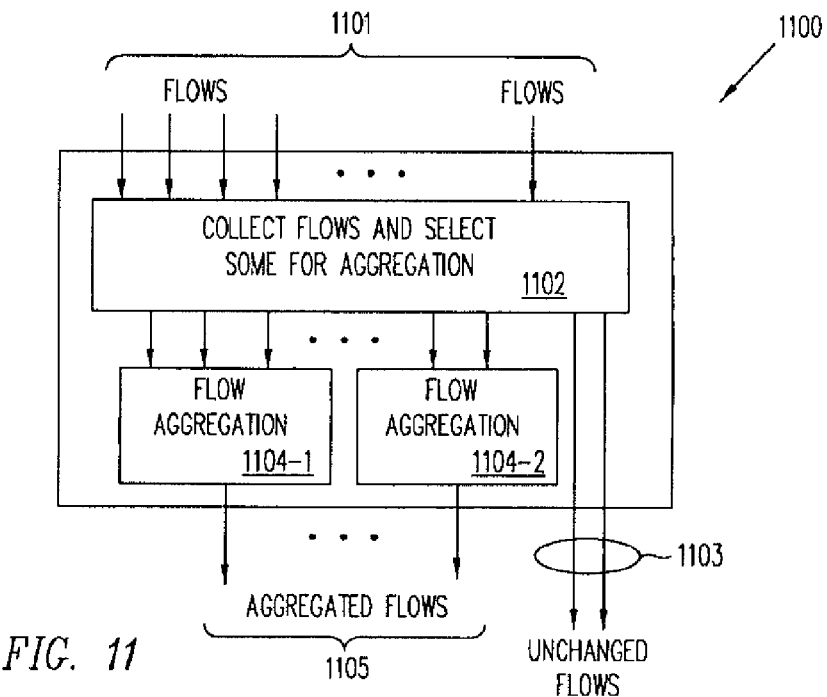
FIG. 11 shows schematically aggregation mechanism 1100 for multiple flows, in accordance with one embodiment of the present invention.

FIG. 11 shows schematically aggregation mechanism 1100 for multiple flows, in accordance with one embodiment of the present invention. Multiple flows 1101 enter into collection circuit 1102, where the flows are collected and grouped. Aggregation circuits 1103-1 and 1103-2 then aggregate selected groups of flows 1104-1 and 1104-2. Flows 1103, which are not to be aggregated, are forwarded without modification or delay.

Figure 12:
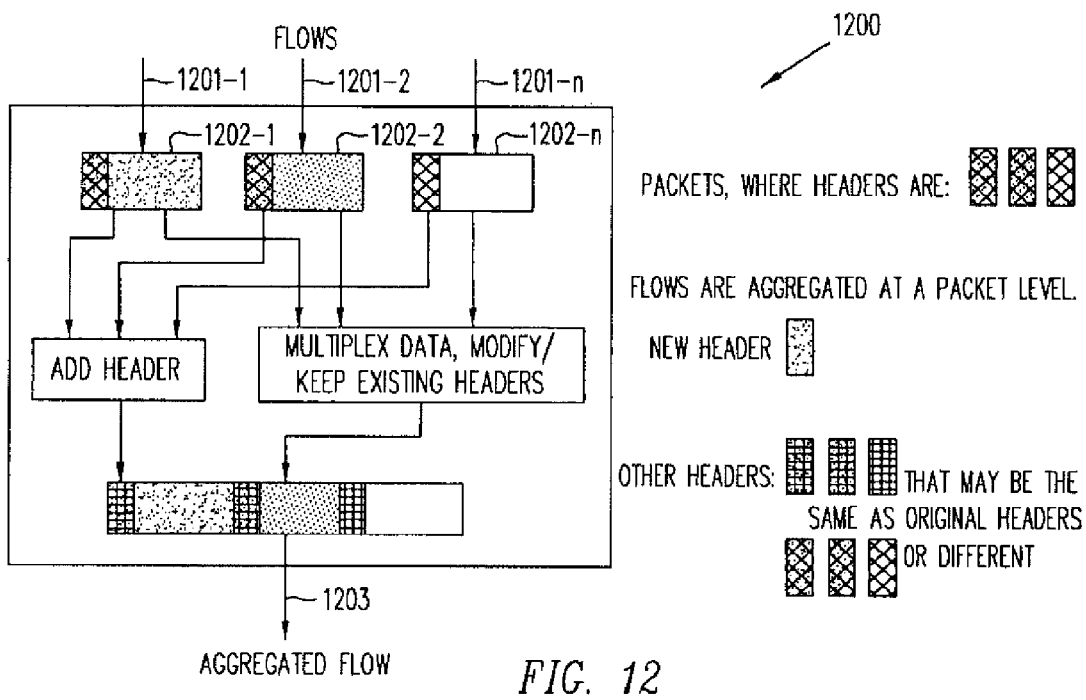
FIG. 12 shows schematically aggregation mechanism 1200, which performs aggregation at the packet level, in accordance with one embodiment of the present invention.

FIG. 12 shows schematically aggregation mechanism 1200, which performs aggregation at the packet level, in accordance with one embodiment of the present invention. As shown in FIG. 12, incoming packets from flows 1201-1, . . . 1201-n are separately buffered at buffers 1202-1, . . . , 1202-n. If needed, an additional header may be added to allow TSI modules (e.g., TSI modules 504-1, . . . , 504-n) at a later stage to reconstitute the original packets from the aggregated packet. Otherwise, existing headers may be modified or simply placed, along with the existing payloads, into the payload of the aggregated packet. The packets in buffers 1202-1, . . . , 1202-n are aggregated and transmitted to a MAC/PHY layer in an aggregated packet 1203 according to an aggregation scheme.

Figure 13:
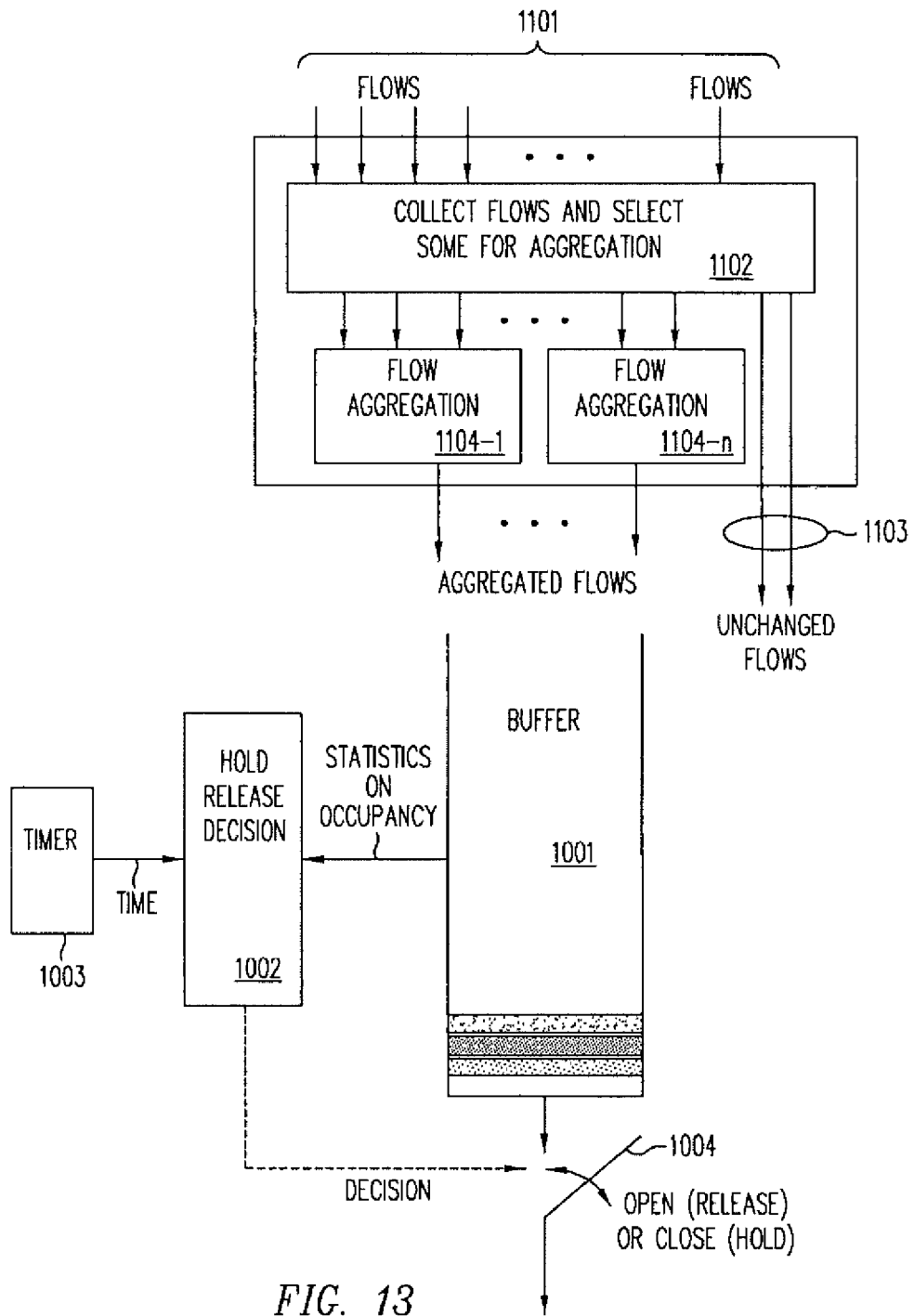
FIG. 13 shows an example in which the hold-and-release decision is applied to the aggregated flows.
Figure 14:
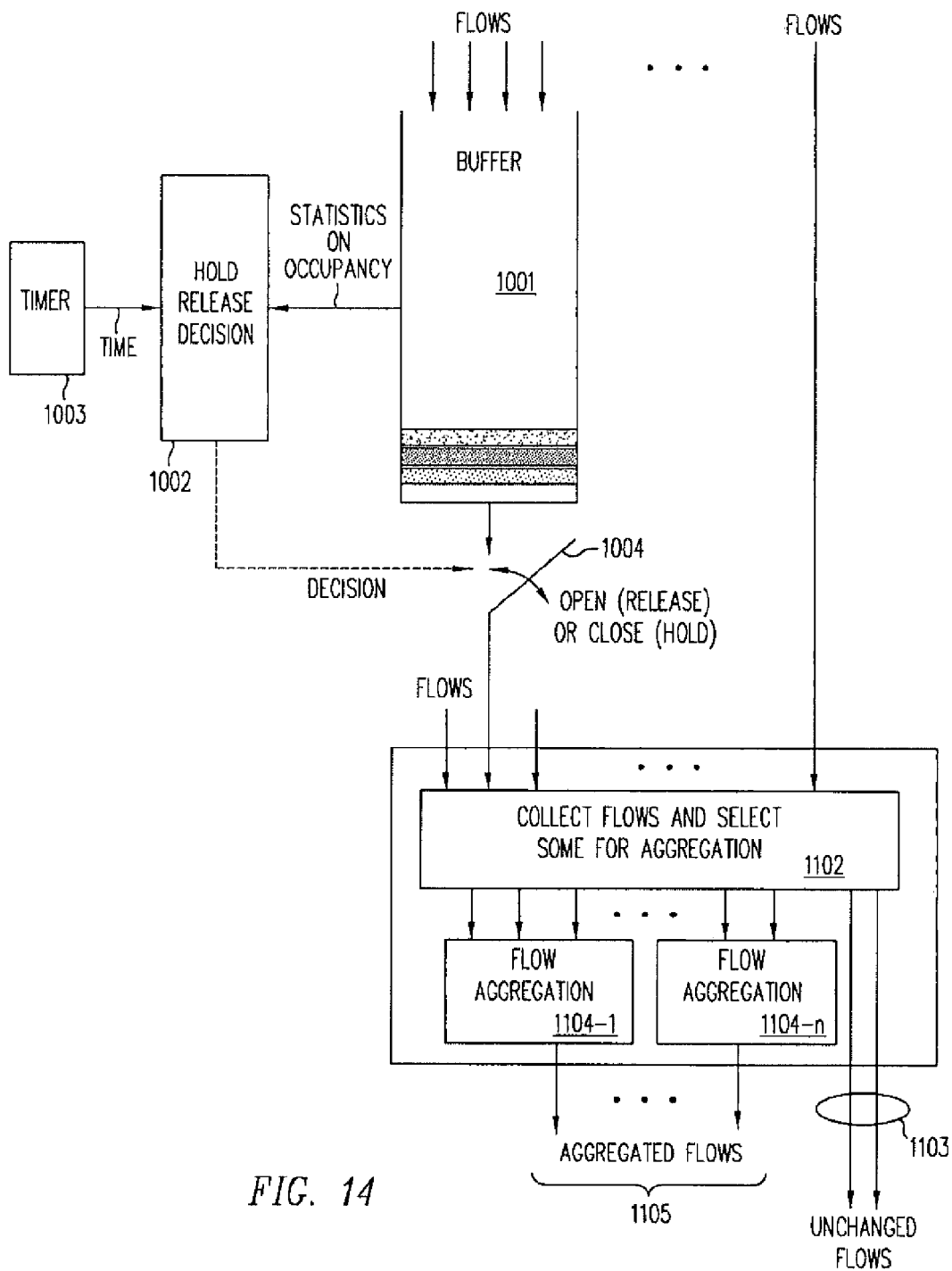
FIG. 14 shows an example that the hold-and-release decision is applied to the incoming flows before aggregation.

Traffic shaping using buffering with the hold-and-release decision scheme can be combined with flow or packet aggregation. FIG. 13 shows an example in which the hold-and-release decision is applied to the aggregated flows. FIG. 14 shows an example when the hold-and-release decision is applied to the incoming flows before aggregation. Depending on the characteristics of the individual flows (e.g., number of packets and frequencies of arrival), these variations within the scope of the present invention would provide different impacts on system capacity and quality of service parameters. These impacts can be ascertained empirically or by simulation. Of course, other variations, such as having multiple buffers (i.e., multiple hold-and-release decisions) before or after aggregation, and multiple streams of aggregation, are possible and contemplated under the present invention.

Like the hold-and-release decision mechanism, aggregation, in particular at the packet level, reduces channel access contention by reducing the number of channel access events. In addition, aggregation reduces MAC-PHY transmission overheads by reducing the portion of the transmission capacity taken up by overhead transmissions (e.g., MAC-PHY headers, preambles in wireless transmissions and acknowledgement (ACK) packets). Greater efficiency in the underlying wireless medium is achieved. Thus, A combination of routing, buffering and aggregation mechanisms improves efficiencies in the MAC-PHY layers.

The detailed description above is provided to illustrate specific embodiments of the present invention and is not intended to be limiting. Numerous variations and modifications within the scope of the present invention are possible. The present invention is set forth in the following claims:

We claim:

1. A method for increasing wireless network efficiency in a multi-hop wireless network with contention-based access which allows for and uses one or more wireless connections ("hops") between a user and a gateway access point, the method comprising:
   providing a plurality of access points to the wireless network, each access point being configurable to perform as a gateway access point or a relay node;
   assigning a plurality of mobile terminals to access the wireless network on a contention basis through the access points; and
   in physical and medium access control layers for one of the access points configured to perform as a relay node, transmitting user data originating from or terminating at the mobile terminals to another one of the access points, the relay node using different packet sizes and a different number of independent packet accesses to the network than the packet sizes and the number of independent packet accesses to the network of such user data received from the mobile terminals; and
   in the relay node, buffering traffic at or above the medium access control layer and releasing traffic at selected times to induce a change in number of packets sent per transmission access grant to the wireless medium.

2. A method as in claim 1, further comprising organizing the access points of the wireless network in a hierarchical configuration to allow changing the packet sizes and the number of independent packet accesses to the network.

3. A method as in claim 2, wherein the organizing takes into consideration the number of access points available and configurable to serve as relay nodes.

4. A method as in claim 2, wherein the organizing takes into consideration a function which allows transmissions to be aggregated at each relay node for transfer to another gateway access point or relay node.

5. A method as in claim 2, wherein the wireless network comprises at least one access point configured to perform as a gateway access point, and wherein the organizing takes into consideration a maximum number of mobile terminals allowed to be assigned to each relay node given other connections to this relay node, and a maximum number of mobile terminals allowed to be directly connected to the gateway access point when a given number of relay nodes are also connected to the gateway access point.

6. A method as in claim 1, wherein the wireless network comprises at least one access point configured to perform as a gateway access point, and wherein the assigning takes into consideration the data flowing directly to the gateway access point from outside the wireless network.

7. A method as in claim 1, wherein the assigning takes into consideration data flows that transmit through one or more selected access points, according to quality of service constraints on the data flows.

8. A method as in claim 7, wherein assigning further takes into consideration the connectivity among the mobile terminals and the access points.

9. A method as in claim 1, wherein assigning specifies routes for data associated with selected mobile terminals.

10. A method as in claim 1, wherein assigning takes into consideration one or more access points configured to perform as relay nodes which change the nature of transmitted packet sizes or the number of packets allowable to be sent per access to the wireless medium.

11. A method as in claim 1, further comprising determining activating or deactivating an access point to operate as a wireless relay in response to a mobile terminal requesting to join the wireless network.

12. A method as in claim 1, wherein a hold-and-release mechanism shapes timing characteristics of data arrival at a medium access control layer.

13. A method as in claim 12, wherein the hold-and-release mechanism releases data packets to the medium access control layer according to the traffic statistics of data packets buffered.

14. A method as in claim 13, wherein the traffic statistics relates to one of: (i) the flows having packets buffered, (ii) type or class of each flow having data packets buffered; (iii) the occupancy of buffers; and (iv) arrival times of each data packet.

15. A method as in claim 12, wherein the hold-and-release mechanism releases data packets to the medium access control layer according to the time the data packets have been buffered or the number of packets in the buffer.

16. A method as in claim 1, wherein the medium access control layer sends data-packets to a physical layer for transmission, the physical layer being capable of transmitting the data packets using a packet bursting scheme.

17. A method as in claim 1, further comprising aggregating multiple data packets received from one or more of the traffic flows into fewer transmission data packets.

18. A method as in claim 4, further comprising aggregating at a relay node data packets received from multiple mobile terminals that are destined for a downstream relay node or a gateway access node into fewer transmission packets.

19. A method as in claim 18, wherein aggregating comprises aggregating data packets received from a plurality of mobile terminals and other relay nodes.

20. A method as in claim 16, wherein the packet bursting scheme at the physical layer initiates bursting when data packets are released as a group from an outbound traffic buffer to the medium access control layer of the relay node.

* * * * *